US012598646B2

(12) United States Patent
Chande et al.

(10) Patent No.: US 12,598,646 B2
(45) Date of Patent: Apr. 7, 2026

(54) FR2-2 ENERGY DETECTION THRESHOLD ADAPTATION WITH TARGET LISTEN BEFORE TALK SENSING BANDWIDTH

(71) Applicant: QUALCOMM Incorporated, San Diego, CA (US)

(72) Inventors: Vinay Chande, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 18/175,446

(22) Filed: Feb. 27, 2023

(65) Prior Publication Data

US 2023/0276497 A1 Aug. 31, 2023

Related U.S. Application Data

(60) Provisional application No. 63/315,037, filed on Feb. 28, 2022.

(51) Int. Cl.
*H04W 74/0816* (2024.01)
*H04W 52/36* (2009.01)
*H04W 74/08* (2009.01)

(52) U.S. Cl.
CPC ..... *H04W 74/0816* (2013.01); *H04W 52/367* (2013.01); *H04W 74/0866* (2013.01)

(58) Field of Classification Search
CPC ........... H04W 74/0816; H04W 52/367; H04W 74/0866; H04W 74/0808
See application file for complete search history.

(56) References Cited

U.S. PATENT DOCUMENTS

| | | | |
|---|---|---|---|
| 2020/0275484 A1* | 8/2020 | Xu | H04W 74/0808 |
| 2022/0053430 A1 | 2/2022 | Chande et al. | |
| 2022/0053562 A1 | 2/2022 | Chande et al. | |
| 2022/0086911 A1* | 3/2022 | Oh | H04W 72/0453 |

FOREIGN PATENT DOCUMENTS

| | | | | |
|---|---|---|---|---|
| EP | 3340725 A1 * | 6/2018 | | H04W 24/08 |
| WO | WO-2021108817 A2 * | 6/2021 | | |

(Continued)

OTHER PUBLICATIONS

Futurewei: "On Issues in Channel Access for Beyond 52.6 GHz", 3GPP TSG RAN WG1 Meeting #107bis-e, R1-2200026, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, XP052092902, 8 Pages, Section 2 EDT Computation and Section Clarification of EDT Bandwidth.

(Continued)

*Primary Examiner* — Ricardo H Castaneyra
(74) *Attorney, Agent, or Firm* — QUALCOMM Incorporated

(57) ABSTRACT

A node configured for communication in a wireless communication network transmits, following a listen before talk process, at least one transmission within an operating channel bandwidth in response to a sensed energy in the operating channel being less than both a first energy detection threshold (EDT) value determined as a function of the channel bandwidth, and a second predetermined EDT value obtained from the node. The first EDT value is determined as the function of the channel bandwidth and further as a function of a ratio of a maximum transmitter power to an intended transmitter power, the intended transmitter power being less than or equal to the maximum power. When the intended and maximum powers are equal, the first EDT value is determined only as the function of the channel (Continued)

bandwidth. The second energy detection threshold value may be determined as a function of a reference channel bandwidth.

16 Claims, 9 Drawing Sheets

(56)                    References Cited

FOREIGN PATENT DOCUMENTS

| WO | WO-2022029365 A1 * | 2/2022 | ........... H04B 17/345 |
| WO | 2023039614 A2 | 3/2023 | |

OTHER PUBLICATIONS

International Search Report and Written Opinion—PCT/US2023/014089—ISA/EPO—Jun. 7, 2023.
Moderator (Qualcomm Incorporated): "FL Summary of Channel Access Mechanism for 52.6GHz-71GHz Band, Ver01", 3GPP TSG RAN WGI Meeting #108-e, R1-2202493, 3rd Generation Partnership Project, Mobile Competence Centre, 650, Route Des Lucioles, F-06921 Sophia-Antipolis Cedex, France, vol. RAN WG1, No. Feb. 21, 2022-Mar. 3, 2022, Feb. 24, 2022, XP052116335, 136 Pages, p. 4-p. 25.
International Preliminary Report on Patentability—PCT/US2023/014089—The International Bureau of WIPO—Geneva, Switzerland—Sep. 12, 2024.

* cited by examiner

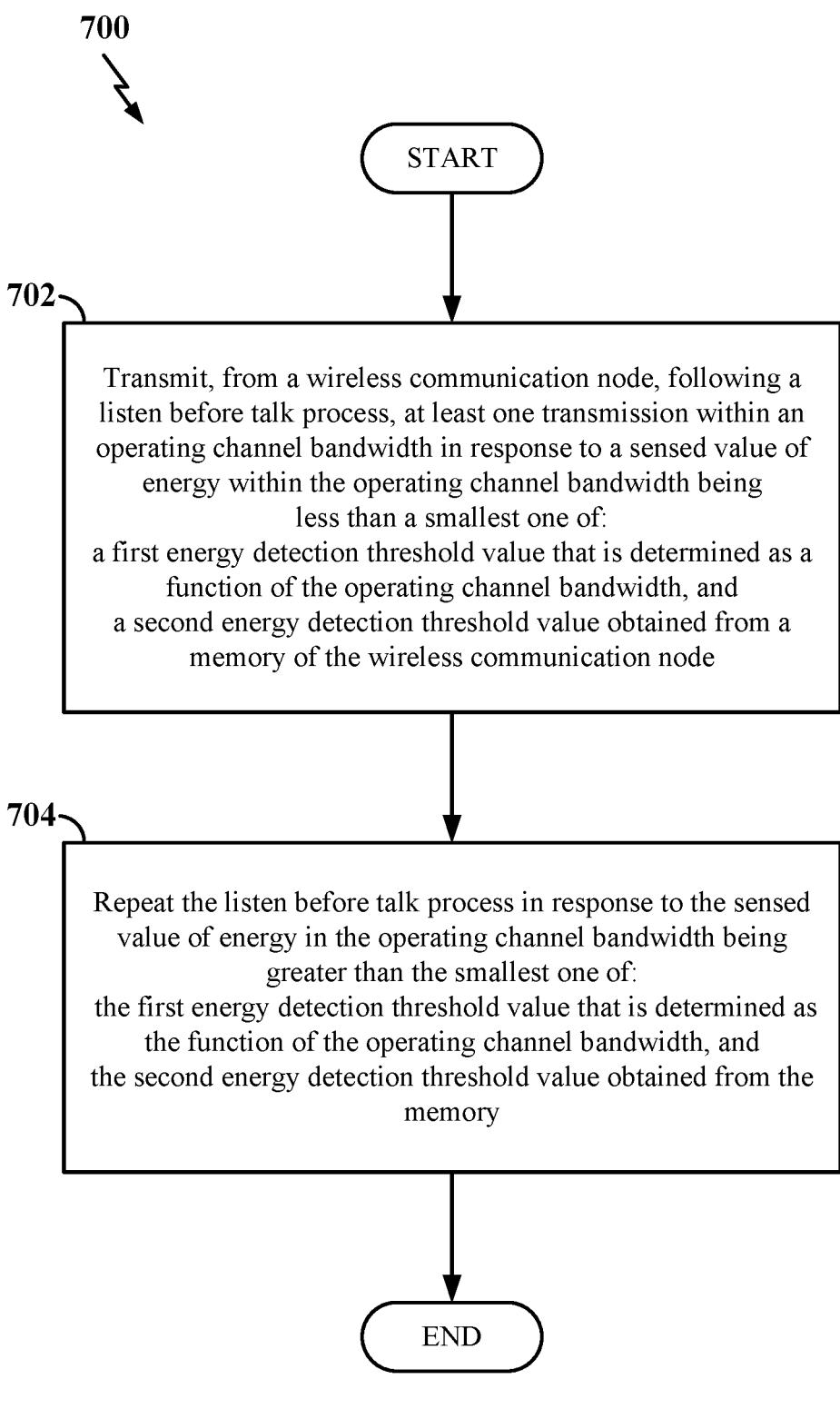

700

START

702 —

Transmit, from a wireless communication node, following a listen before talk process, at least one transmission within an operating channel bandwidth in response to a sensed value of energy within the operating channel bandwidth being less than a smallest one of:
a first energy detection threshold value that is determined as a function of the operating channel bandwidth, and
a second energy detection threshold value obtained from a memory of the wireless communication node

704 —

Repeat the listen before talk process in response to the sensed value of energy in the operating channel bandwidth being greater than the smallest one of:
the first energy detection threshold value that is determined as the function of the operating channel bandwidth, and
the second energy detection threshold value obtained from the memory

END

FIG. 7

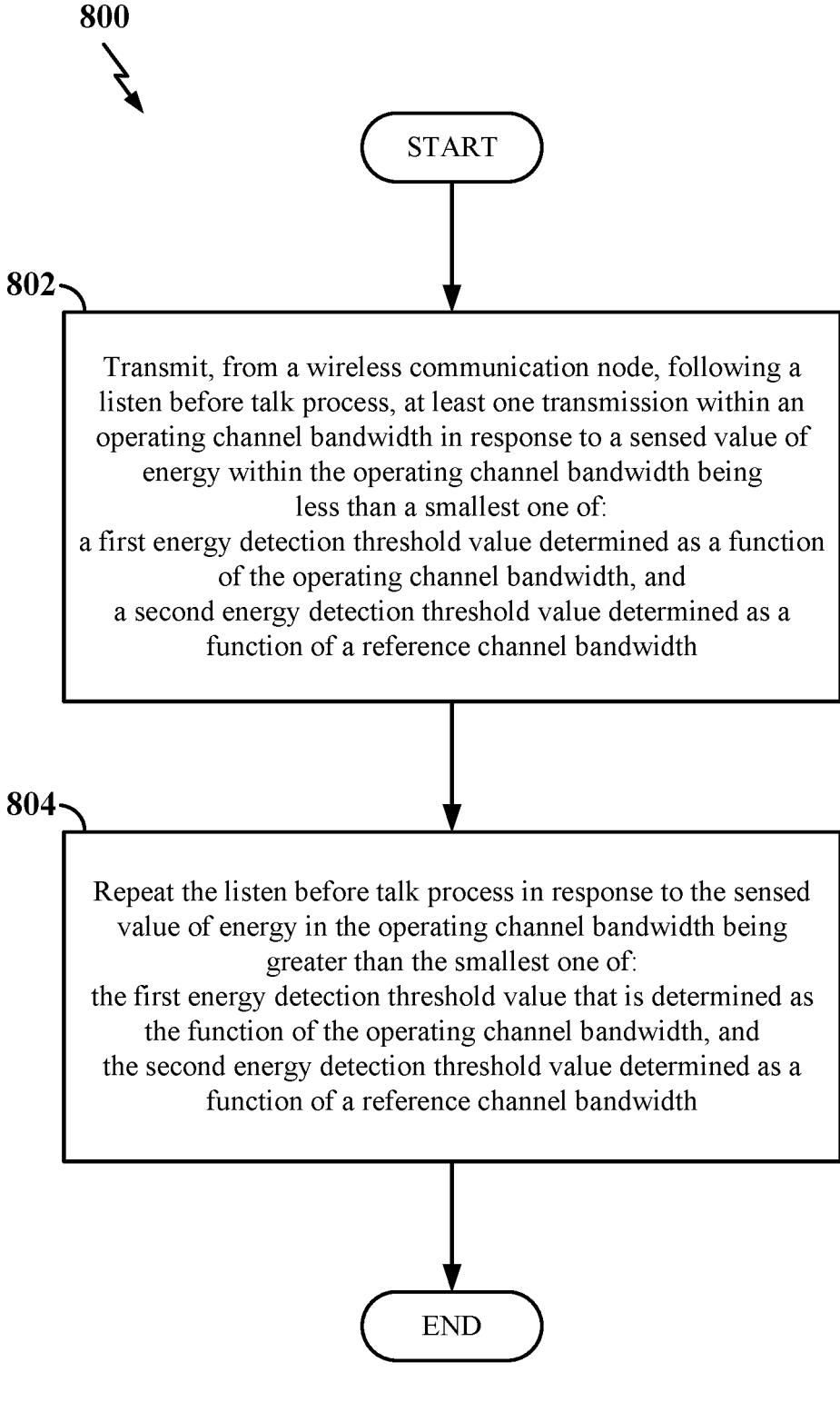

800

START

802

Transmit, from a wireless communication node, following a listen before talk process, at least one transmission within an operating channel bandwidth in response to a sensed value of energy within the operating channel bandwidth being less than a smallest one of:
a first energy detection threshold value determined as a function of the operating channel bandwidth, and
a second energy detection threshold value determined as a function of a reference channel bandwidth

804

Repeat the listen before talk process in response to the sensed value of energy in the operating channel bandwidth being greater than the smallest one of:
the first energy detection threshold value that is determined as the function of the operating channel bandwidth, and
the second energy detection threshold value determined as a function of a reference channel bandwidth

END

FIG. 8

FR2-2 ENERGY DETECTION THRESHOLD ADAPTATION WITH TARGET LISTEN BEFORE TALK SENSING BANDWIDTH

CROSS-REFERENCE TO RELATED APPLICATIONS

This application for patent claims priority to and the benefit of provisional patent application No. 63/315,037, filed in the United States Patent and Trademark Office on Feb. 28, 2022, the entire content of which is incorporated herein by reference as if fully set forth below in its entirety and for all applicable purposes.

TECHNICAL FIELD

The technology discussed below relates generally to wireless communication systems and, more particularly, to an adaptation of an FR2-unlicensed (FR2-2) energy detection threshold determination based on a target listen before talk energy-sensing bandwidth.

INTRODUCTION

Entities utilizing different radio access technologies (RATs), such as New Radio-unlicensed (NR-U) and Wireless Fidelity (WiFi)/Wireless Gigabit (WiGig), may use the same unlicensed spectrum. Entities sharing the unlicensed spectrum may use, for example, listen before talk (LBT) processes (also referred to herein as LBT procedures) to ensure fair use of the unlicensed spectrum. Through LBT, a given entity may minimize the likelihood that its transmission will not collide with another entity's transmission. An LBT process may involve sensing the energy in a given bandwidth. If the sensed energy is above a determined energy detection threshold (EDT), an assumption is made that the channel(s) within the given bandwidth is occupied, and the entity sensing the energy will refrain from transmitting in the channel(s). Different RATs may have different ways of determining EDT, leading to disparities in channel access opportunities between entities utilizing the different RATs in the same frequency bands.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a node configured for communication in a wireless communication network, is disclosed. The node includes a wireless transceiver, a memory, and a processor coupled to the wireless transceiver and the memory. According to one aspect, the processor is configured to: transmit, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from the memory.

In another example, a method, at a node configured for communication in a wireless communication network, is disclosed. The method includes transmitting, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

According to one aspect, a node configured for communication in a wireless communication network is disclosed. The node includes means for transmitting, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

According to another aspect, a computer-readable medium storing computer-executable code is disclosed. When the computer-executable code is executed by a processing circuit of a node configured for communication in a wireless communication network, the computer-executable code causes the processing circuit to transmit, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

In another example, a first node configured for communication in a wireless communication network is disclosed. The first node includes a wireless transceiver, a memory, and a processor coupled to the wireless transceiver and the memory. In one aspect the processor is configured to transmit, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

In another example, a method at a first node configured for communication in a wireless communication network is disclosed. According to one aspect, the method includes transmitting, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

In still another example, a first node configured for communication in a wireless communication network is disclosed. The first node includes means for transmitting, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

According to one aspect, another computer-readable medium storing computer-executable code is disclosed. In this aspect, when the computer-executable code is executed by a processing circuit of a first node configured for communication in a wireless communication network, the processing circuit is caused to transmit, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 7 is a flow chart illustrating an exemplary process at a node in a wireless communication network according to some aspects of the disclosure.

FIG. 8 is a flow chart illustrating an exemplary process at a node in a wireless communication network according to some aspects of the disclosure.

DETAILED DESCRIPTION

Figure 1:
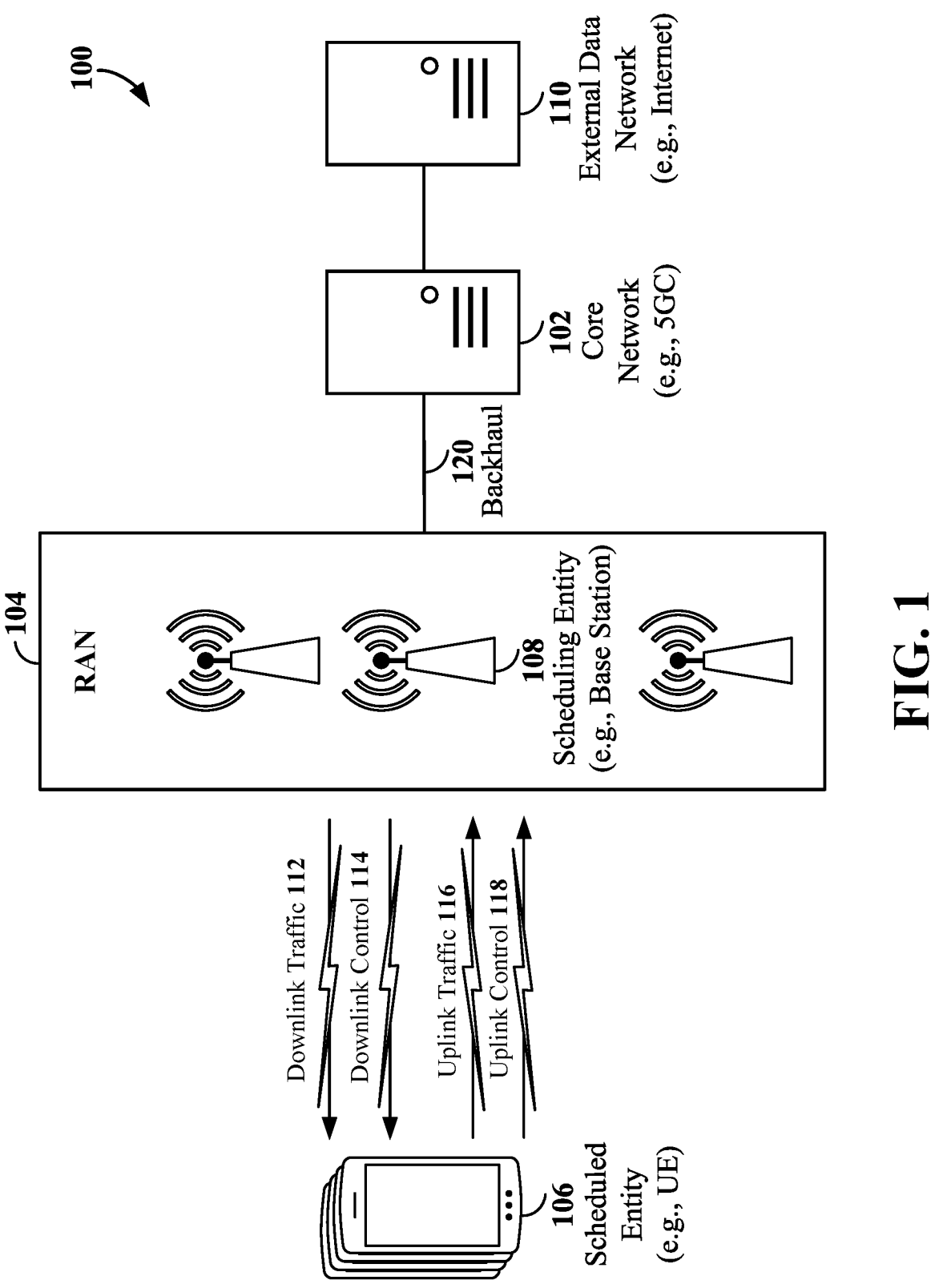
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc. of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (6 GHZ-71 GHz). The FR2 spectrum may be divided into an FR2-1 part (6 GHz-52.6 GHZ) and an FR2-2 part (52.6 GHz and 71 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control 118, downlink control 114, downlink traffic 112, and/or uplink traffic 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
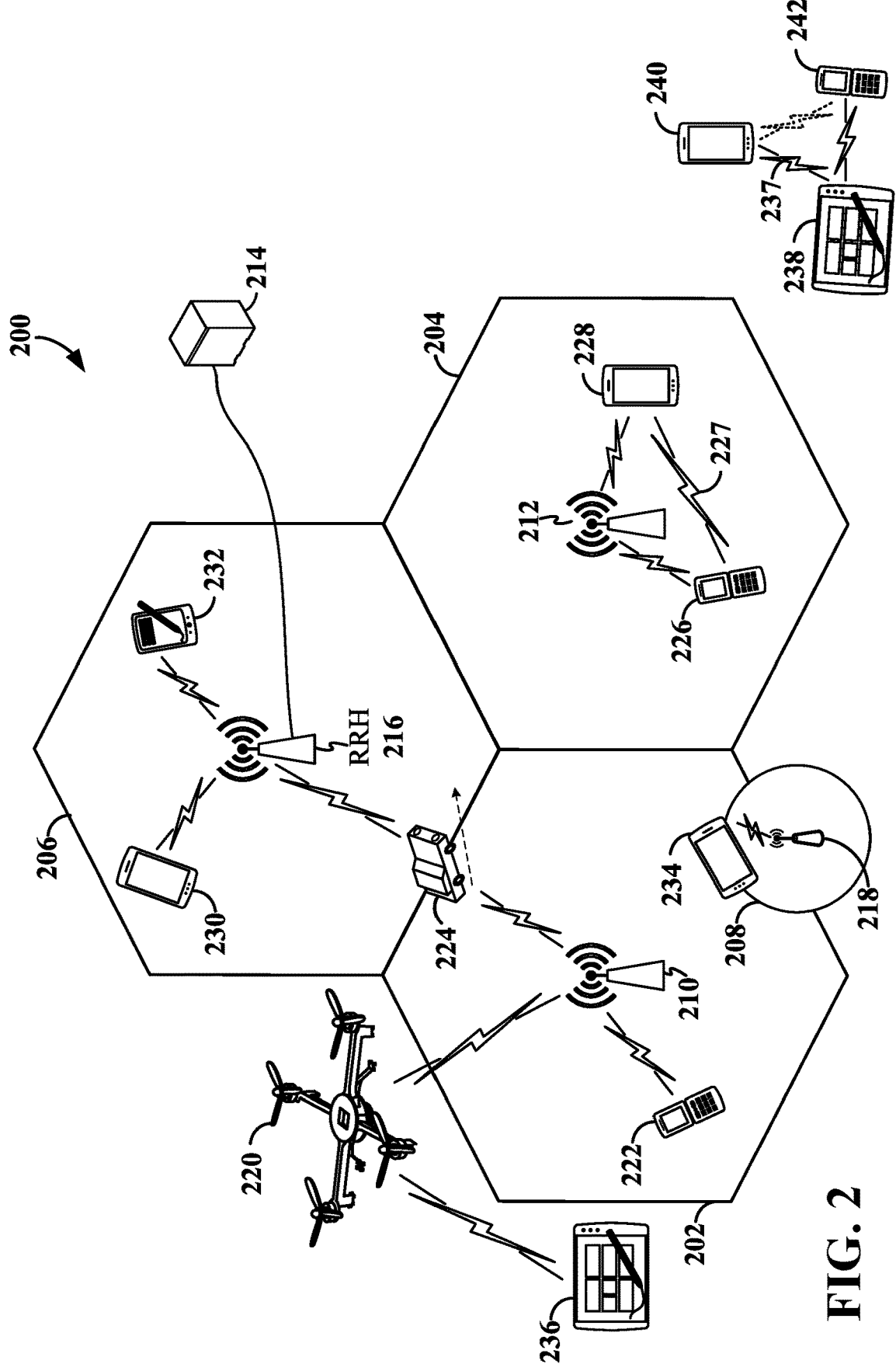
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication.

The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
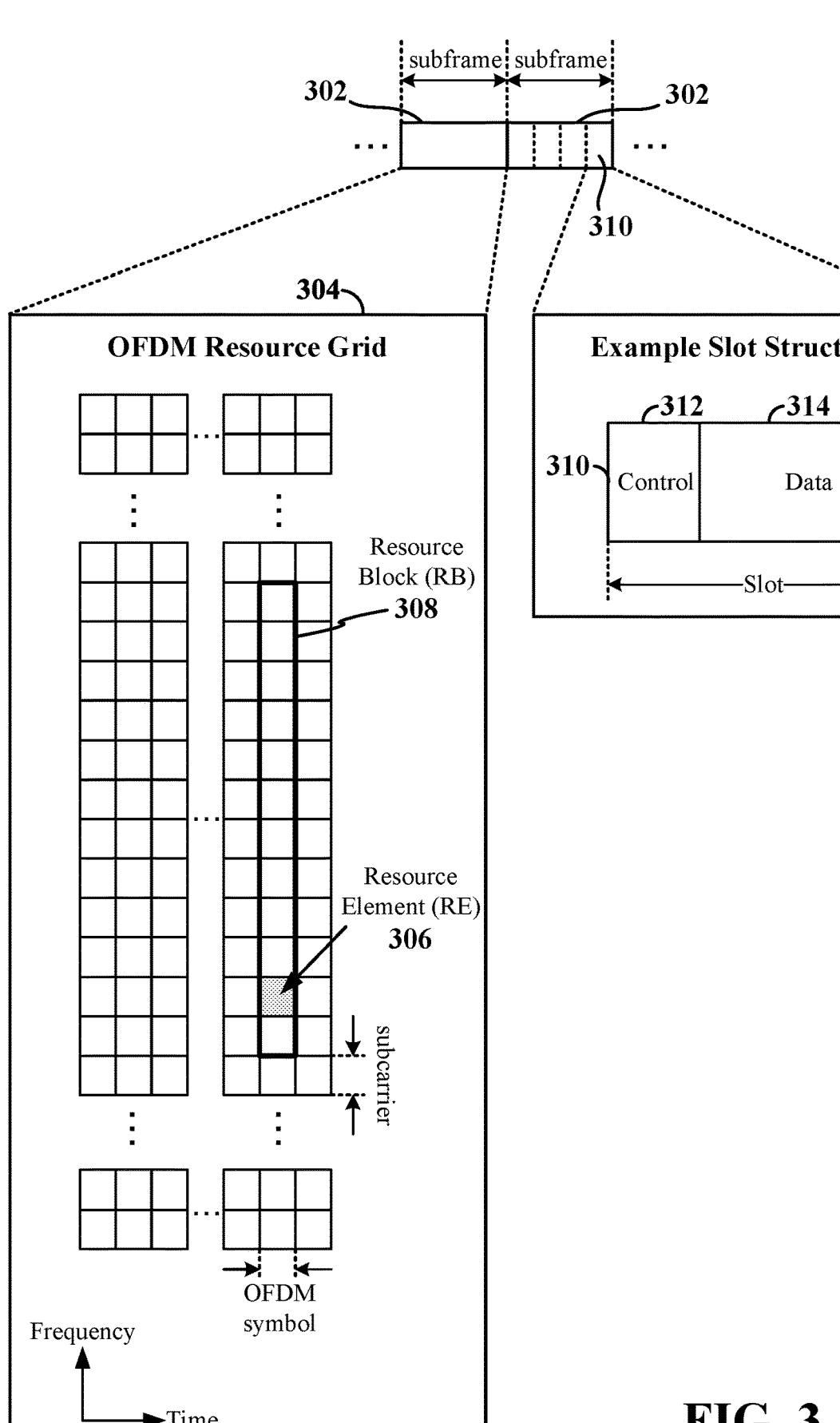
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

Described herein are examples of New Radio-unlicensed (NR-U) wireless communication nodes that may operate in the frequency range identified as FR2-2. FR2-2 identifies an unlicensed frequency range. The NR-U wireless communication nodes may share this unlicensed frequency range with nodes having the same radio access technology (RAT) or different RAT combinations. In the unlicensed bands, entities are not scheduled for communication. Instead, all entities (including UEs and gNBs) perform channel sensing to determine whether any given channel bandwidth (e.g., an operating channel bandwidth) is occupied. An example of a channel sensing procedure includes a contention-based protocol (CBP). A CBP may be a communications protocol utilized by wireless telecommunication equipment (e.g., a node, a UE, a gNB) that permits many transmitting entities to use one radio channel without pre-coordination. One example of a CBP is a listen before talk (LBT) process.

If occupied, the node performing the channel sensing procedure does not transmit; instead, the node may repeat the channel sensing procedure until it finds that the channel intended for its transmission is not occupied. The wireless communication node senses the energy in a given bandwidth to determine if a channel is occupied. The sensed energy is compared to a determined energy detection threshold (EDT) value. In some examples, the EDT value for the unlicensed band may be pre-configured on an entity (e.g., by an original equipment manufacturer (OEM)) and may be based on one or more standards or specifications. For some entities using a first RAT in a first unlicensed band, the EDT value may be a function of the channel operating bandwidth, where EDT increases as channel operating bandwidth increases. For other entities using a second RAT in the same first unlicensed band, the channel operating bandwidth may be a factor in their EDT determinations. In some examples, the EDT may be treated as a constant. In other words, for the entities of the second RAT, the channel operating bandwidth (which is the bandwidth used for sensing energy in the channel) may be fixed. The disparity in the use of channel operating bandwidth as a factor in EDT determinations between different RATs may allow entities in the first RAT to have an advantage over entities in the second RAT. In various aspects of the disclosure, the EDT values of the entities of the first RAT may be adapted by use of target or predefined sensing bandwidths, or sensing bandwidths that are limited and/or predefined in order to reduce the disparity between EDTs utilized by entities using the first RAT and entities using the second RAT.

Figure 4:
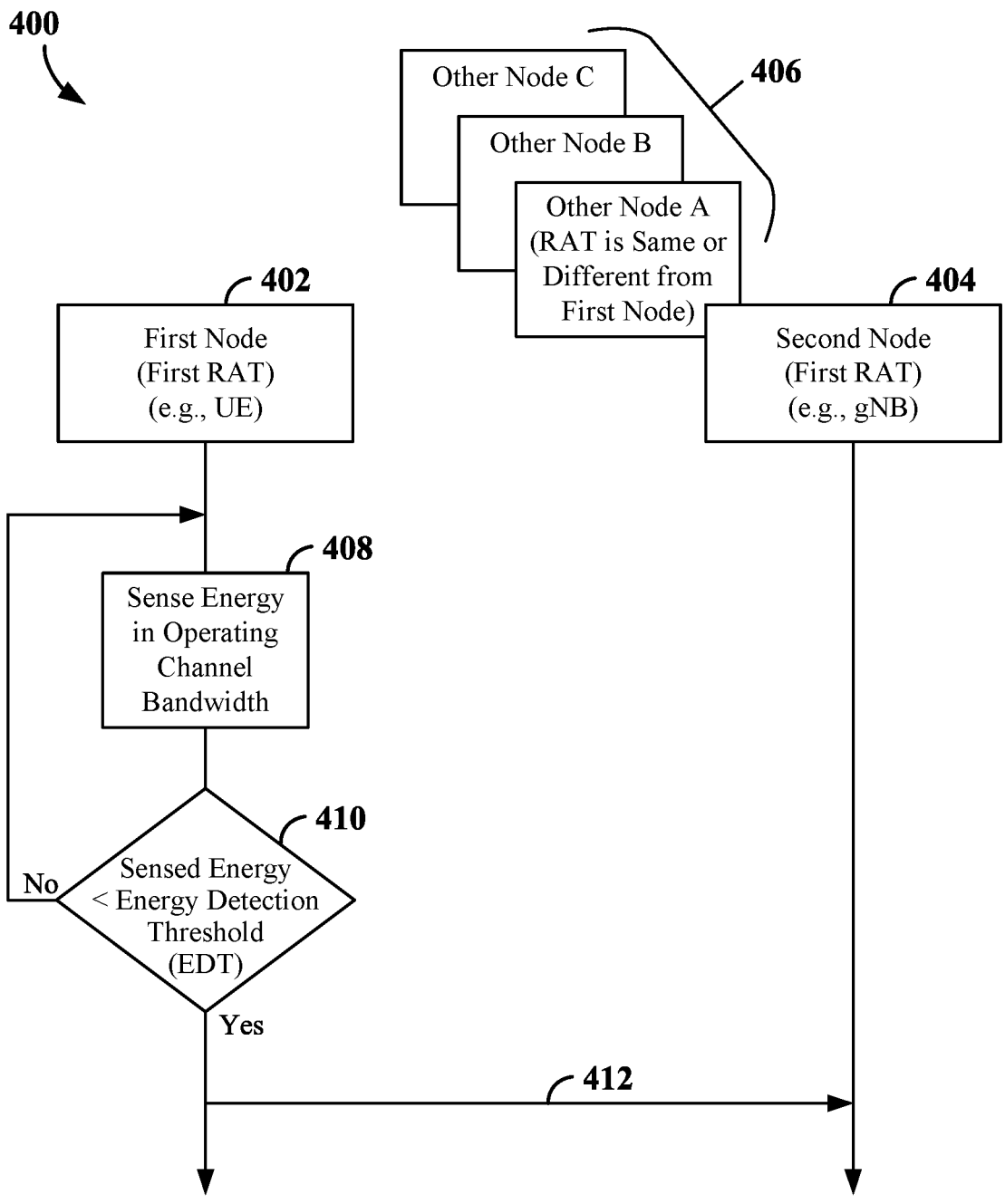
FIG. 4 is a diagram illustrating an example of a listen before talk process between two nodes according to some aspects of the disclosure.

In general, and as described in an example LBT process of FIG. 4, an entity (e.g., first node 402) in the unlicensed FR2-2 region, having a pending transmission (e.g., a traffic and/or control pending transmission), may conduct an LBT process to determine whether a given operating channel bandwidth in the unlicensed spectrum (FR2-2) is available for use. An LBT process may allow the shared use of the same unlicensed spectrum by establishing a set of agreed-upon and predetermined rules that all transmitting entities (e.g., nodes, UEs, gNBs) desiring to use the same unlicensed spectrum may follow. Application of the predetermined rules may equalize the transmission opportunities for all entities in the vicinity of one another.

FIG. 4 is a diagram illustrating an example of a listen before talk (LBT) process 400 between two nodes according to some aspects of the disclosure. In the example, a first node 402 may be a UE while a second node 404 may be a gNB; however, the LBT process 400 is the same if the first node 402 is the gNB and the second node 404 is the UE. According to the example, both the first node 402 and the second node 404 utilize the same first radio access technology (RAT). The first RAT may be 5G NR-U operating in FR2-2. Three other nodes A, B, C 406 are depicted in the vicinity of the first node 402 and the second node 404. The other nodes A, B, C 406 may utilize the first RAT, one or more different RATs, or a combination of the first RAT and one or more different RATs. The commonality between the first node 402, the second node 404, and the other nodes A, B, C 406 is that they all operate in unlicensed spectrum, in this example, in FR2-2.

At block 408, the first node 402, which intends to transmit in the uplink to the second node 404, may begin the LBT process 400 by sensing the energy within a given operating channel bandwidth of the first node 402. The operating channel bandwidth may be, for example and without limitation, an entire carrier bandwidth or may be one or more bandwidth parts within the carrier bandwidth. At block 410, the first node 402 may determine if the value of the sensed energy is less than an energy detection threshold (EDT) value associated with the first RAT. In some examples, the EDT may be a function of a maximum allowable transmitted power (e.g., which may be expressed as a maximum allowable Equivalent Isotropic Radiated Power (EIRP)) and an intended transmitted power (e.g., which may also be expressed as an EIRP). According to some aspects, the intended transmitted power may be less than or equal to the maximum allowable transmitted power. According to some examples, the maximum allowable transmitted power may be 40 dBm. In some examples, the EDT may additionally or alternatively be a function of the given operating channel bandwidth.

In general, the larger the operating channel bandwidth, the greater the EDT. Accordingly, nodes determining EDTs using a first operating channel bandwidth may have an advantage over nodes determining EDTs using a second relatively smaller operating channel bandwidth. For example, consider two side-by-side nodes with equal maximum allowable transmitted power, equal intended transmitted power, and equal energy in the space surrounding the two side-by-side nodes; however, because the first node 402 uses a larger operating channel bandwidth (relative to that used by the second node) to determine its EDT, the EDT determined by the first node 402 (i.e., first node's determined EDT) is greater than the sensed energy while the second node's determined EDT is less than the sensed energy. In this example, the first node 402 may satisfy the LBT criteria and transmit, but the second node may fail to satisfy the LBT criteria and may be prohibited from transmitting.

At block 410, if the sensed energy (sensed by the first node 402) is greater than the first node's determined EDT, the first node 402 would fail to satisfy the LBT criteria and would be prohibited from transmitting. The LBT process 400 may return to block 408 to repeat the sensing process in this event. However, if at block 410, the sensed energy is less than the first node's determined EDT, then, at 412, the first node 402 may transmit traffic and/or control to the second node 404.

The mm Wave bands of FR-2 provide large bandwidths for users. Despite the large bandwidth, different RATs may share the same channels. Aspects described herein may support NR unlicensed (NR-U) operation in FR2 (e.g., between 52.6 GHz and 71 GHz), for example. Aspects described herein further provide techniques for a transmitting entity (e.g., transmitting node, a UE transmitting in uplink, or a base station transmitting in downlink) to determine whether a given operating bandwidth in the unlicensed spectrum within FR2-2 is available for use by the transmitting entity.

In the context of an LBT process, the concept of vicinity may be related to both distance and power. For example, a receiver at a receiving entity may receive the same power (e.g., the same energy) from a first transmitting entity and a second transmitting entity even though the second transmitting entity is twice the distance from the receiving entity as is the first transmitting entity. This example may arise in an instance where a second transmitted power of the second transmitting entity is greater than a first transmitted power of the first transmitting entity. In other words, considering isotropic transmit and receive antennas for all transmitting and receiving entities for simplicity of explanation, the power received at the receiving entity from the first transmitting entity transmitting a 0 dBm (1 mW) signal from one mile away will be the same as the power received from a second transmitting entity transmitting a 6 dBm (approximately 4 mW) signal from two miles away. From the vantage point of an LBT process, both the first and second transmitters may be in the same vicinity as the receiving entity.

The preceding example is provided for purposes of discussion and not limitation. In real-world examples, antennas are not isotropic; they may have directional gain. Losses due to atmospheric absorption may complicate the issue of vicinity. For example, two radiating entities may be equidistant from a receiving entity. Yet, atmospheric conditions may attenuate the first transmitting entity's signal power (i.e., the signal received by the receiving entity). In other examples, the straight-line distances between transmitting and receiving entities may be equal, but one of the transmitting entities may be within a building, behind a wall, or behind a natural obstruction.

In general, an LBT process may cause each entity seeking channel access to determine an EDT and compare a sensed energy in a channel to the EDT. Although various RATs are standardized, the standards of different RATs may define EDT differently. Aspects described herein may be applicable to any standard related to EDT, regardless of the possibly unique definitions of EDT adopted in the various standards at any given date. By way of example, for discussion and not for limitation, pertinent parts of an ETSI European standard EN 302 567 and a 3GPP standard TS 37.213 are compared below.

In ETSI EN 302 567 v2.1.0 section 4.2.5.3.6 (EDT for clear channel assessment checking related to "multiple-gigabit/s radio equipment operating in the 60 GHz band for a harmonized standard covering the essential requirements of article 3.2 of Directive 2014/53/EU,") EDT may be given by equation (1) below. In 3GPP TS 32.213 v17.0.0 (EDT for an "adaptivity (medium access protocol) LBT mechanism in physical layer procedures for shared spectrum channel access") EDT may be given by equation (2) below.

$$EDT = -47 \text{ dBm} + (40 \text{ dBm} - Pout) \tag{1}$$

where:

Pout is the mean equivalent isotropically radiated power (EIRP) given in dBm for the transmitting node (e.g., gNB/UE) during a transmission burst, and $$EDT = -80 \text{ dBm} + Pmax - Pout + 10\log_{10}(BW) \tag{2}$$

$$= -80 \text{ dBm} + 10\log_{10}\left(\frac{Pmax}{Pout}\right) + 10\log_{10}(BW)$$

where:

Pmax is the maximum EIRP allowed by regulation (presently 40 dBm),

Pout is the maximum EIRP of the intended transmission by the node determining the EDT (e.g., gNB/UE) during a channel occupancy time (COT) (presently 5 μSec), and the node is not expected to transmit in the COT with a higher Pout than the Pout used to determine the EDT to acquire the COT, and BW is the operating channel bandwidth in MHz.

When operating channel bandwidth is considered for EDT determinations, such as the EDT exemplified in equation (2), it may be useful to place a limit on the operating channel bandwidth (BW). As explained above, if the operating channel bandwidth is not limited, a first entity may gain an unfair advantage over a second entity by determine EDT utilizing an operating channel bandwidth that is relatively larger than the one used by the second entity. In this non-limiting example, EDT is logarithmically proportional to operating channel bandwidth. As such, the first entity would find it easier to satisfy the EDT requirement of an LBT process because the first entity's determined EDT would be greater than the second entity's determined EDT.

Another RAT, other than NR, which is expected to occupy the unlicensed 60 GHz band (FR2-2), is WiFi/WiGig. WiFi/

WiGig uses a fixed bandwidth for LBT detection threshold sensing, namely 2.16 GHZ (2160 MHz). As explained above, under a baseline expression for energy threshold determination, which increases with bandwidth and has no limit on that bandwidth (e.g., equation (2), above), if a node is contending to occupy a given bandwidth, it is advantageous for that node to utilize a widest operating channel bandwidth as possible for the node's EDT calculation, with a caveat being that the given bandwidth is included within the widest operating channel. For NR nodes, the given bandwidth may be greater than 2 GHZ and, therefore, greater than the fixed bandwidth of 2.16 GHz utilized by WiFi/WiGig for that RAT's LBT process. Without limits on NR operating channel bandwidth, WiFi/WiGig devices may be at a disadvantage with respect to NR devices.

According to aspects described herein, an EDT expression may be utilized to limit an EDT value used by a node (e.g., a gNB, a UE). The EDT value used by the node may be a specific value, such as a maximum permitted value. The specific value may be stored in a memory of a node (e.g., a memory of a gNB or UE). In some aspects, the specific value may be configured to the node (e.g., via radio resource control (RRC) signaling or any other method), thereby allowing the maximum value to be dynamically changed. Limiting the EDT value utilized by the node to a maximum value may remove the aspect of operating channel bandwidth disparities from the determination of EDT.

According to one aspect, a node may transmit, following a listen before talk process, at least one transmission (e.g., a traffic or control transmission) within an operating channel bandwidth if a sensed value of energy within the operating channel bandwidth is less than a smallest one of: a first energy detection threshold value that is determined as a function of the operating channel bandwidth, and a second energy detection threshold value obtained from a memory of the node. In some aspects, the node may repeat the listen before talk process if the sensed value of energy within the operating channel bandwidth is greater than the smallest one of: the first energy detection threshold value that is determined as the function of the operating channel bandwidth, and the second energy detection threshold value obtained from the memory.

For example, a maximum value of EDT ($EDT_{Max}$) may be defined and stored in a node. The maximum value of EDT may be based on an agreement made between manufacturers and operators of transmitting nodes (e.g., gNBs, UEs, access points) of various radio access technologies. The radio access technologies may include, for example, 5G NR and WiFi/WiGig. In one aspect, the maximum value of EDT may be set so that all users of an unlicensed spectrum have an equal or approximately equal opportunity to transmit in a given channel following an LBT process that indicates the given channel is available.

By way of example and not limitation, the EDT utilized by a given node may be the smaller of $EDT_{Max}$ and a predetermined expression of EDT, such as the expression given by equation (2). The predetermined expression of EDT may be referred to herein as $EDT_0$. This example of EDT may be expressed mathematically as:

$$EDT=\min(EDT_0,EDT_{Max}), \tag{3}$$

where:
$EDT_{Max}$ is a predetermined agreed-upon value, and
$EDT_0=-80 \text{ dBm}+10 \log_{10}(Pmax/Pout)+10 \log_{10}(BW)$
(as described in connection with equation (2)).
The use of the expression of $EDT_0$, as given above, is exemplary and non-limiting. According to one aspect, any value of EDT that is smaller than $EDT_0$ may be compliant with existing standards, therefore selecting EDT to be the minimum one of the values of $EDT_0$ and $EDT_{Max}$ may also be compliant with current standards, even if the value of $EDT_{Max}$ is greater than the value of $EDT_0$.

According to some examples, a first EDT value may be determined as both a function of the operating channel bandwidth and a function of a ratio of a first transmit power value corresponding to a maximum transmitter power (Pmax) and a second transmit power value corresponding to an intended transmitter power (Pout) of a given node, where the second transmit power value is less than or equal to the first transmit power value.

However, it may be observed that when the second transmit power value (Pout) is equal to the first transmit power value (Pmax), the second addend (i.e., $10 \log_{10}$ (Pmax/Pout)) reduces to zero (0) because $\log_{10}(1)=0$. Accordingly, when the second transmit power value is equal to the first transmit power value, an energy detection threshold value may be determined solely as a function of the operating channel bandwidth; therefore, Pout (and Pmax) may be effectively removed from the determination of EDT. In other words, for Pout=Pmax, an upper limit of the determined EDT may be chosen independently of Pout.

In this example, if equation (2) is utilized to determine $EDT_{Max}$, then equation (2) may reduce to:

$$EDT_{Max}=-80 \text{ dBm}+10 \log_{10}(BW) \tag{4}$$

When utilizing equation (4), the parameter BW need not be limited to the intended operating channel bandwidth of the transmitting node. In one example, the parameter BW may be changed to a reference bandwidth (e.g., BW=BWref), and equation (4) may reduce to:

$$EDT_{Max}=-80 \text{ dBm}+10 \log_{10}(BWref) \tag{5}$$

BWref may be selected to be equal to a maximum channel bandwidth used to determine EDT, which is utilized by all nodes (e.g., including the first node 402, the second node 404, and the other nodes A, B, C 406 as shown and described in connection with FIG. 4) to determine EDT. In such an example, EDT may be equal to a smaller (minimum) one of the values of $EDT_0$ and the value of $EDT_{Max}$. In this example, EDT may be mathematically represented by the following equation:

$$EDT=\min(EDT_0,EDT_{Max}), \tag{6}$$

where:
$EDT_0$ may be a baseline expression of EDT (e.g., given by one of equations (2) or (5)).
For example, when $EDT_{Max}$ is determined via a baseline expression for EDT where Pout=Pmax, BW=BWref, and BWref=2000 MHz (as might be utilized in 5G NR-U), equations (2) and (5) both reduce to:

$$EDT_{Max}=-80 \text{ dBm}+10 \log_{10}(2000)=-47 \text{ dBm, and} \tag{7}$$

Where Pout=Pmax, BW=BWref, and BWref=2160 MHz (as might be utilized in WiFi/WiGig), equations (2) and (5) both reduce to:

$$EDT_{Max}=-80 \text{ dBm}+10 \log_{10}(2160)=-46.655 \text{ dBm.} \tag{8}$$

Accordingly, using equation (6) for illustrative and non-limiting purposes:

$$EDT=\min(EDT_0,EDT_{Max})=\min(-47 \text{ dBm},-46.655 \text{ dBm})=-47 \text{ dBm}$$

In another example, $EDT_{Max}$ may be defined based on a reference channel bandwidth (BWref), such as the reference channel bandwidth described above. According to this example, BW of equation (2) may be set equal to the reference channel bandwidth, which yields the following expression:

$$EDT = -80 \text{ dBm} + 10 \log_{10} (\text{Pmax/Pout}) + 10 \log_{10} (\text{BWref}) \quad (9)$$

where:

Pmax is the maximum EIRP allowed by regulation (presently 40 dBm),

Pout is the maximum EIRP of the intended transmission by the node determining the EDT (e.g., gNB/UE), and BWref is the reference channel bandwidth in MHz, 0<BWref<BWrefMax, and BWrefMax is a largest allowed bandwidth of BWref.

Figure 5:
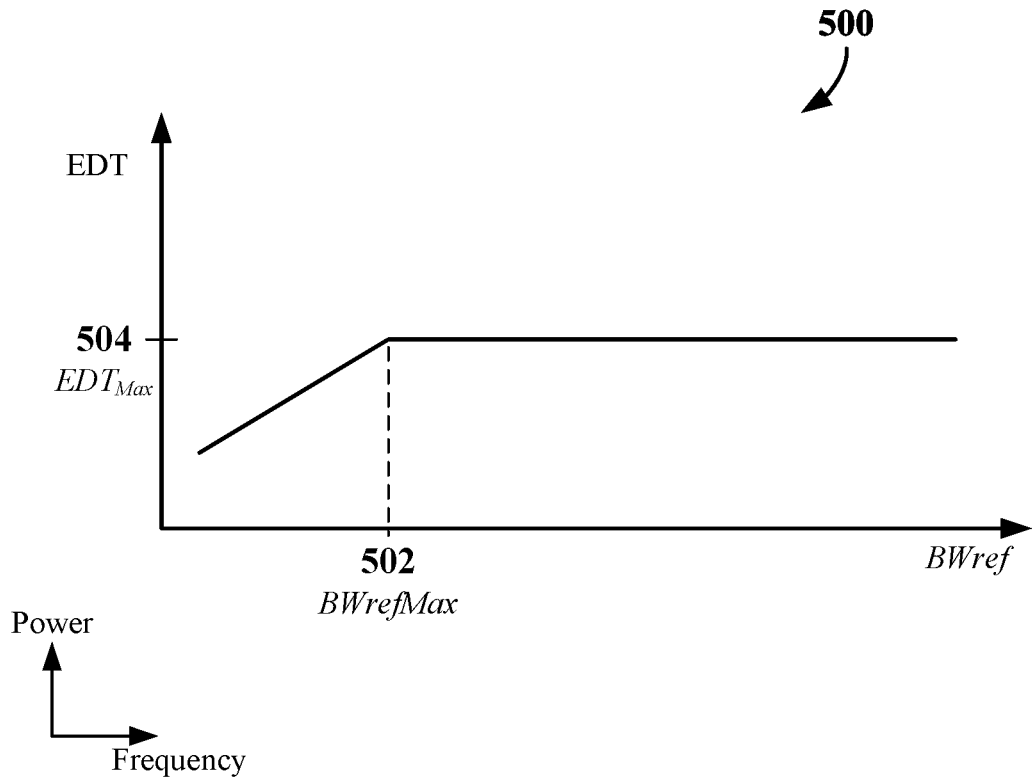
FIG. 5 is a graph depicting values of an energy detection threshold (EDT) according to some aspects of the disclosure.

FIG. 5 is a graph depicting EDT 500 (as presented in equation (9) above), with Pout=Pmax (reducing the second addend of equation (9) to zero for ease of illustration). FIG. 5 is depicted on a semi-log coordinate system, with EDT along the logarithmic vertical axis with units of dBm and BWref along the linear horizontal axis with units of MHz. As depicted, as BWref rises in frequency from a lower value toward a maximum allowable value, BWrefMax 502, EDT rises in power from a lower value to a relatively higher maximum value, $EDT_{Max}$ 504. EDT reaches its maximum value when BWref=BWrefMax. After that, as BWref increases, EDT remains constant at its maximum power level, $EDT_{Max}$ 504.

According to some non-limiting illustrative examples, and as shown in connection with FIG. 5, $$EDT_{Max} = -80 \text{ dBm} + 10 \log_{10} (\text{Pmax/Pout}) + 10 \log_{10} (\text{BWref}), \text{ and} \quad (10)$$

$$EDT = \min (EDT_0, EDT_{Max}) \quad (11)$$

where:

$EDT_0$ is a baseline EDT expression, such as that given by equation (2).

Alternatively, EDT may be expressed as follows:

$$EDT = -80 \ dBm + 10 \log_{10}\left(\frac{Pmax}{Pout}\right) + 10 \log_{10}(\min(BW, BWref)) \quad (11)$$

where:

Pmax is the maximum EIRP allowed by regulation (presently 40 dBm),

Pout is the EIRP of the intended transmission by the node determining the EDT and Pout≤Pmax, BW is the operating channel bandwidth in MHz, and BWref is the reference channel bandwidth.

Figure 6:
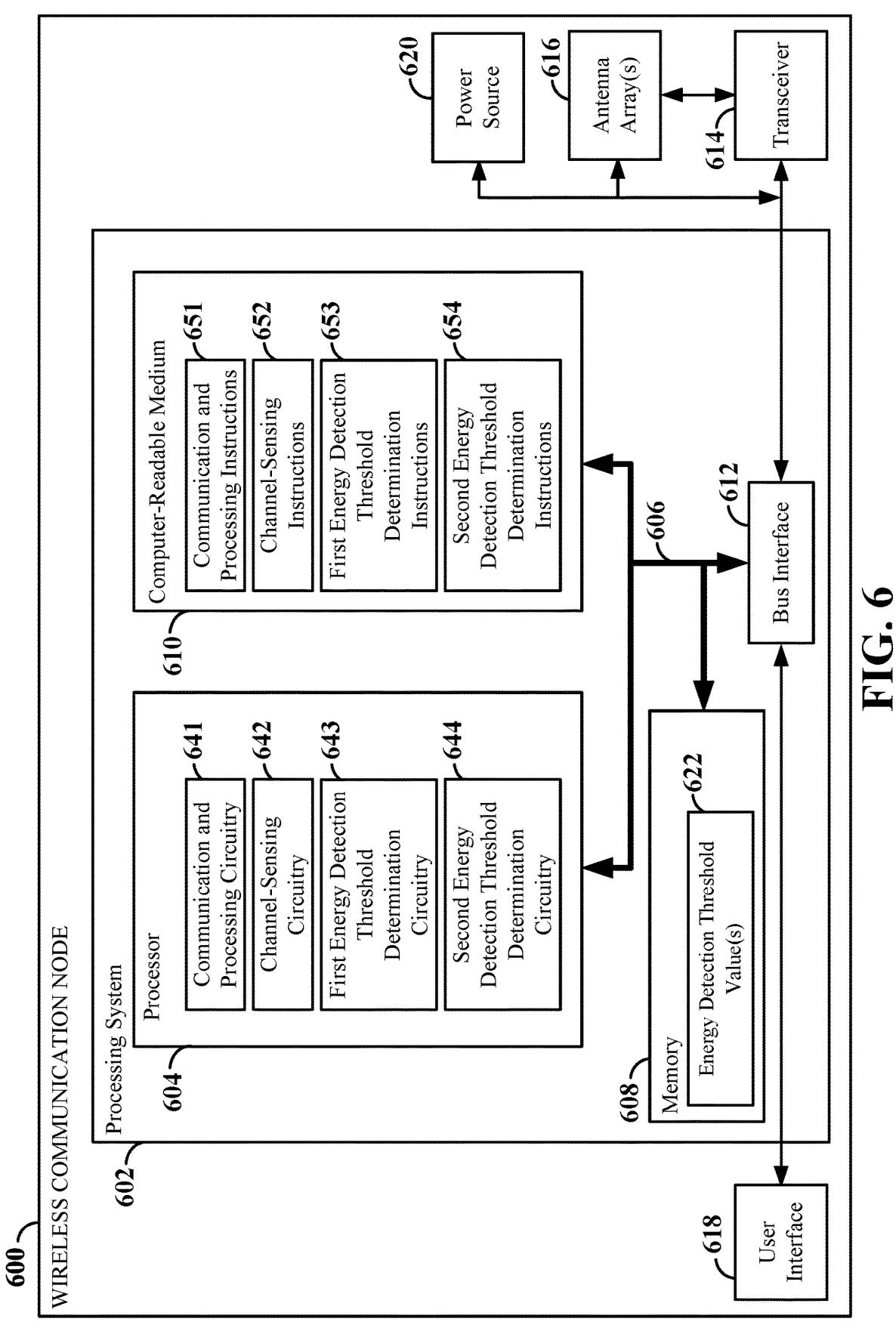
FIG. 6 is a block diagram illustrating an example of a hardware implementation of a wireless communication node employing a processing system according to some aspects of the disclosure.

FIG. 6 is a block diagram illustrating an example of a hardware implementation of a wireless communication node 600 (also referred to as a node herein) employing a processing system 602 according to some aspects of the disclosure. The wireless communication node 600 may be, for example, a base station, an eNB, a gNB, a network access node, a user equipment, or an access point, as illustrated in any one or more of FIGS. 1, 2, and/or 4. The preceding list is illustrative and non-limiting.

In accordance with various aspects of the disclosure, an element, or any portion of an element, or any combination of elements may be implemented with a processing system 602 that includes one or more processors, such as processor 604 (also referred to herein as a processing circuit). Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication node 600 may be configured to perform one or more of the functions described herein. That is, the processor 604, as utilized in the wireless communication node 600, may be used to implement any one or more of the methods or processes described and illustrated, for example, in FIGS. 4, 7, and/or 8.

The processor 604 may in some examples be implemented via a baseband or modem chip and in other implementations, the processor 604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 602 may be implemented with a bus architecture, represented generally by the bus 606. The bus 606 may include any number of interconnecting buses and bridges depending on the specific application of the processing system 602 and the overall design constraints. The bus 606 communicatively couples together various circuits, including one or more processors (represented generally by the processor 604), a memory 608, and computer-readable media (represented generally by the computer-readable medium 610). The bus 606 may also link various other circuits such as timing sources, peripherals, voltage regulators, and power management circuits, which are well known in the art and will not be described any further.

A bus interface 612 provides an interface between the bus 606 and a transceiver 614. The transceiver 614 may be a wireless transceiver. The transceiver 614 may provide a means for communicating with various other apparatus over a transmission medium (e.g., air interface). The transceiver 614 may further be coupled to one or more antenna arrays (hereinafter antenna array 616). In some examples, the transceiver 614 and the antenna array 616 may be configured to transmit and receive using directional beamforming (e.g., using a single beam or a beam pair link (BPL) on each of the uplink and downlink transmissions). The bus interface 612 further provides an interface between the bus 606 and a user interface 618 (e.g., keypad, display, touch screen, speaker, microphone, control features, etc.). Of course, such a user interface 618 is optional and may be omitted in some examples. In addition, the bus interface 612 further provides an interface between the bus 606 and a power source 620 of the wireless communication node 600.

The processor 604 is responsible for managing the bus 606 and general processing, including the execution of software stored on the computer-readable medium 610. The software (e.g., computer-executable code), when executed by the processor 604, causes the processing system 602 to perform the various functions described below for any particular apparatus. The computer-readable medium 610 and the memory 608 may also be used for storing data that is manipulated by the processor 604 when executing software.

Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise. The software may reside on the computer-readable medium 610. When executed by the processor 604, the software may cause the processing system 602 to perform the various processes and functions described herein for any particular apparatus.

The computer-readable medium 610 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 610 may reside in the processing system 602, external to the processing system 602, or distributed across multiple entities including the processing system 602. The computer-readable medium 610 may be embodied in a computer program product or article of manufacture. By way of example, a computer program product or article of manufacture may include a computer-readable medium in packaging materials. In some examples, the computer-readable medium 610 may be part of the memory 608. Those skilled in the art will recognize how best to implement the described functionality presented throughout this disclosure depending on the particular application and the overall design constraints imposed on the overall system.

In some aspects of the disclosure, the processor 604 may include communication and processing circuitry 641 configured for various functions, including, for example, communicating with a UE in an instance when the wireless communication node 600 is a base station (e.g., a gNB) or communicating with a base station in an example when the wireless communication node 600 is a UE. The communication and processing circuitry 641 may also communicate with other wireless communication nodes, a network core (e.g., a 5G core network), scheduling entities, or any other entity, such as, for example, local infrastructure or an entity communicating with the wireless communication node 600 via the Internet, such as a network provider.

In some examples, the communication and processing circuitry 641, in connection with the transceiver 614 and the antenna array(s) 616, for example, may configure the processor and the memory of the wireless communication node 600 to: transmit, following a listen before talk process, at least one of traffic or control within an operating channel bandwidth of the wireless communication node 600 if a sensed value of energy within the operating channel bandwidth (e.g., obtained by the channel-sensing circuitry 642) is less than a smallest one of: a first energy detection threshold value determined as a function of the operating channel bandwidth (e.g., obtained by the first energy detection threshold determination circuitry 643), and a second energy detection threshold value obtained from the memory 608

(e.g., obtained from the memory 608 by the second energy detection threshold determination circuitry 644). In some aspects, the communication and processing circuitry 641 may further configure the processor 604 and the memory 608 to repeat the listen before talk process if the sensed value of energy within the operating channel bandwidth is greater than the smallest one of: the first energy detection threshold value that is determined as the function of the operating channel bandwidth, and the second energy detection threshold value obtained from the memory 608. In some examples, the communication and processing circuitry 641 may include one or more hardware components that alone, or in combination with other circuits, such as, for example, the channel-sensing circuitry 642, the first energy detection threshold determination circuitry 643, the second energy detection threshold determination circuitry 644, the transceiver 614, and the antenna array(s) 616 provide the physical structure that performs processes related to transmitting, following a listen before talk process, at least one of traffic or control within an operating channel bandwidth of the wireless communication node 600 if a sensed value of energy within the operating channel bandwidth is less than a smallest one of: a first energy detection threshold value determined as a function of the operating channel bandwidth, and a second energy detection threshold value obtained from the memory 608.

In some aspects, the communication and processing circuitry 641 may further configure the processor 604 and the memory 608 to repeat the listen before talk process if the sensed value of energy within the operating channel bandwidth is greater than the smallest one of: the first energy detection threshold value that is determined as the function of the operating channel bandwidth, and the second energy detection threshold value obtained from the memory 608. According to some examples, the communication and processing circuitry 641 may include one or more hardware components that alone, or in combination with other circuits, such as those described above, may provide the physical structure that performs processes related to repeating the listen before talk process if the sensed value of energy within the operating channel bandwidth is greater than the smallest one of: the first energy detection threshold value that is determined as the function of the operating channel bandwidth, and the second energy detection threshold value obtained from the memory.

The communication and processing circuitry 641 may also further configure the processor 604 and the memory 608 to repeat the listen before talk process if the sensed value of energy within the operating channel bandwidth is greater than the smallest one of: the first energy detection threshold value that is determined as the function of the operating channel bandwidth, and the second energy detection threshold value obtained from the memory 608. According to some examples, the communication and processing circuitry 641 may include one or more hardware components that alone, or in combination with other circuits, such as those described above, may provide the physical structure that performs processes related to repeating the listen before talk process if the sensed value of energy within the operating channel bandwidth is greater than the smallest one of: the first energy detection threshold value that is determined as the function of the operating channel bandwidth, and the second energy detection threshold value obtained from the memory 608.

According to other aspects, the communication and processing circuitry 641, in connection with the transceiver 614 and the antenna array(s) 616, for example, may configure the processor and the memory to: transmit, following a listen before talk process, at least one of traffic or control within an operating channel bandwidth if a sensed value of energy within the operating channel bandwidth is less than a smallest one of: a first energy detection threshold value determined as a function of the operating channel bandwidth, and a second energy detection threshold value determined as a function of a reference channel bandwidth. According to some examples, the communication and processing circuitry 641 may include one or more hardware components that alone, or in combination with other circuits, such as those described above, may provide the physical structure that performs processes related to configuring the processor and the memory to: transmit, following a listen before talk process, at least one of traffic or control within an operating channel bandwidth if a sensed value of energy within the operating channel bandwidth is less than a smallest one of: a first energy detection threshold value determined as a function of the operating channel bandwidth, and a second energy detection threshold value determined as a function of a reference channel bandwidth.

In some examples, the communication and processing circuitry 641 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 641 may include one or more transmit/ receive chains.

In some implementations where the communication involves receiving information, the communication and processing circuitry 641 may obtain or identify information from a component of the wireless communication node 600 (e.g., from the transceiver 614 that receives the information via radio frequency signaling or some other type of signaling suitable for the applicable communication medium), process (e.g., decode) the information, and output the processed information. For example, the communication and processing circuitry 641 may output the information to another component of the processor 604, to the memory 608, or to the bus interface 612. In some examples, the communication and processing circuitry 641 may receive one or more of: signals, messages, other information, or any combination thereof. In some examples, the communication and processing circuitry 641 may receive information via one or more channels. In some examples, the communication and processing circuitry 641 may include functionality for a means for receiving. In some examples, the communication and processing circuitry 641 may include functionality for a means for processing, including a means for demodulating, a means for decoding, etc.

In some implementations where the communication involves sending (e.g., transmitting) information, the communication and processing circuitry 641 may obtain or identify information (e.g., from another component of the processor 604, the memory 608, or the bus interface 612), process (e.g., modulate, encode, etc.) the information, and output the processed information. For example, the communication and processing circuitry 641 may output the information to the transceiver 614 (e.g., that transmits the information via radio frequency signaling or some other type of signaling suitable for the applicable communication medium). In some examples, the communication and processing circuitry 641 may send one or more of signals, messages, other information, or any combination thereof. In some examples, the communication and processing circuitry

641 may send information via one or more channels. In some examples, the communication and processing circuitry 641 may include functionality for a means for sending (e.g., a means for transmitting). In some examples, the communication and processing circuitry 641 may include functionality for a means for generating, including a means for modulating, a means for encoding, etc. In some examples, the communication and processing circuitry 641 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna array 616 and the transceiver 614.

In some aspects of the disclosure, the processor 604 may include channel-sensing circuitry 642 configured for various functions, including, for example, obtaining a sensed value of energy within an operating channel bandwidth of the wireless communication node 600. In some examples, the channel-sensing circuitry 642 may include one or more hardware components that alone, or in combination with other circuits, such as, for example, the transceiver 614, provide the physical structure that performs processes related to obtaining a sensed value of energy within an operating channel bandwidth of the wireless communication node 600. The channel-sensing circuitry 642 may further be configured to execute channel-sensing software 652 stored on the computer-readable medium 610 to implement one or more functions described herein.

In some aspects of the disclosure, the processor 604 may include first energy detection threshold determination circuitry 643 configured for various functions, including, for example, obtaining a first energy detection threshold value that is determined as a function of the operating channel bandwidth. In some examples, the first energy detection threshold determination circuitry 643 may include one or more hardware components that alone, or in combination with other circuits, such as, for example, the communication and processing circuitry 641, provide the physical structure that performs processes related to determining a first energy detection threshold value that is determined as a function of the operating channel bandwidth. The first energy detection threshold determination circuitry 643 may further be configured to execute first energy detection threshold determination software 653 stored on the computer-readable medium 610 to implement one or more functions described herein.

In some aspects of the disclosure, the processor 604 may include second energy detection threshold determination circuitry 644 configured for various functions, including, for example, obtaining a second energy detection threshold value from the memory 608. In one example, the second energy detection threshold value may be stored in an energy detection threshold value(s) location 622 of the memory 608. In some instances, the second energy detection threshold determination circuitry 644 may include one or more hardware components that alone, or in combination with other circuits, such as, for example, the communication and processing circuitry 641, provide the physical structure that performs processes related to obtaining a second energy detection threshold value from the memory 608. The second energy detection threshold determination circuitry 644 may further be configured to execute second energy detection threshold determination software 654 stored on the computer-readable medium 610 to implement one or more functions described herein.

FIG. 7 is a flow chart illustrating an exemplary process 700 (e.g., a method of wireless communication) at a node in a wireless communication network according to some aspects of the disclosure. For example, the node may be a base station (e.g., a gNB) or a UE as shown and described in any of FIGS. 1, 2, 4, and/or 6 according to some aspects of the disclosure. As described below, some or all illustrated features may be omitted in a particular implementation within the scope of the present disclosure, and some illustrated features may not be required for all implementations. In some examples, the process 700 may be carried out by the wireless communication node 600 illustrated in FIG. 6. In some examples, the process 700 may be carried out by any suitable apparatus or means for carrying out the functions or algorithms described herein.

At block 702, the wireless communication node may transmit, following a listen before talk process, at least one of traffic or control within an operating channel bandwidth if a sensed value of energy within the operating channel bandwidth is less than a smallest one of: a first energy detection threshold value that is determined as a function of the operating channel bandwidth, and a second energy detection threshold value obtained from the memory. By way of example and not limitation, the communication and processing circuitry 641, in combination with the channel-sensing circuitry 642, the first energy detection threshold determination circuitry 643, the second energy detection threshold determination circuitry 644 the memory, 608, the transceiver 614, and the antenna array(s) 616, as shown and described above in connection with FIG. 6, may provide means for transmitting, following a listen before talk process, at least one of traffic or control within an operating channel bandwidth if a sensed value of energy within the operating channel bandwidth is less than a smallest one of: a first energy detection threshold value that is determined as a function of the operating channel bandwidth, and a second energy detection threshold value obtained from the memory.

At block 704, the wireless communication node may repeat the listen before talk process if the sensed value of energy within the operating channel bandwidth is greater than the smallest one of: the first energy detection threshold value that is determined as the function of the operating channel bandwidth, and the second energy detection threshold value obtained from the memory. By way of example and not limitation, the communication and processing circuitry 641, in combination with the transceiver 614, and the antenna array(s) 616, as shown and described above in connection with FIG. 6, may provide means for repeating the listen before talk process if the sensed value of energy within the operating channel bandwidth is greater than the smallest one of: the first energy detection threshold value that is determined as the function of the operating channel bandwidth, and the second energy detection threshold value obtained from the memory.

According to some aspects, the first energy detection threshold value may be determined as both a function of the operating channel bandwidth and a function of a ratio of a first transmit power value (corresponding to a maximum transmitter power) and a second transmit power value (corresponding to an intended transmitter power). In some examples, the second transmit power value is less than or equal to the first transmit power value. In some instances, when the second transmit power value is equal to the first transmit power value, the first energy detection threshold value is determined only as the function of the operating channel bandwidth.

FIG. 8 is a flow chart illustrating an exemplary process 800 (e.g., a method of wireless communication) at a node in a wireless communication network according to some aspects of the disclosure. For example, the node may be a base station (e.g., a gNB) or a UE as shown and described in any of FIGS. 1, 2, 4, and/or 6 according to some aspects of the disclosure. As described below, some or all illustrated features may be omitted in a particular implementation within the scope of the present disclosure, and some illustrated features may not be required for all implementations. In some examples, the process 800 may be carried out by the wireless communication node 600 illustrated in FIG. 6. In some examples, the process 800 may be carried out by any suitable apparatus or means for carrying out the functions or algorithms described herein.

At block 802, the wireless communication node may transmit, following a listen before talk process, at least one of traffic or control within an operating channel bandwidth if a sensed value of energy within the operating channel bandwidth is less than a smallest one of: a first energy detection threshold value determined as a function of the operating channel bandwidth, and a second energy detection threshold value determined as a function of a reference channel bandwidth. By way of example and not limitation, the communication and processing circuitry 641, in combination with the channel-sensing circuitry 642, the first energy detection threshold determination circuitry 643, the second energy detection threshold determination circuitry 644 the memory, 608, the transceiver 614, and the antenna array(s) 616, as shown and described above in connection with FIG. 6, may provide means for transmitting, following a listen before talk process, at least one of traffic or control within an operating channel bandwidth if a sensed value of energy within the operating channel bandwidth is less than a smallest one of: a first energy detection threshold value determined as a function of the operating channel bandwidth, and a second energy detection threshold value determined as a function of a reference channel bandwidth.

At block 804, the wireless communication node may repeat the listen before talk process if the sensed value of energy in the operating channel bandwidth is greater than the smallest one of: the first energy detection threshold value that is determined as the function of the operating channel bandwidth, and the second energy detection threshold value determined as a function of a reference channel bandwidth. By way of example and not limitation, the communication and processing circuitry 641, in combination with the transceiver 614 and the antenna array(s) 616, as shown and described above in connection with FIG. 6, may provide means for repeating the listen before talk process if the sensed value of energy in the operating channel bandwidth is greater than the smallest one of: the first energy detection threshold value that is determined as the function of the operating channel bandwidth, and the second energy detection threshold value determined as a function of a reference channel bandwidth.

In some examples, the reference channel bandwidth may be fixed, and may be obtained from the memory. According to some aspects, the first node may be configured to operate in a first frequency band according to a first radio access technology. The reference channel bandwidth may be less than or equal to a maximum channel bandwidth used to determine EDT, which is utilized by all nodes including the wireless communication node to determine EDT. For example, the channel bandwidths available to WiFi/WiGig nodes are limited to 100, 400, 800, 1600, and 2000 MHz. In contrast, NR-U nodes may utilize carrier aggregation, for example, to obtain channel bandwidths that range from 50 MHz to several GHz. However, if all entities performing LBT processes in the same band were limited to use a maximum of 2000 MHz to determine EBT, then calculations of EDTs by all entities may be fair.

Figure 9:
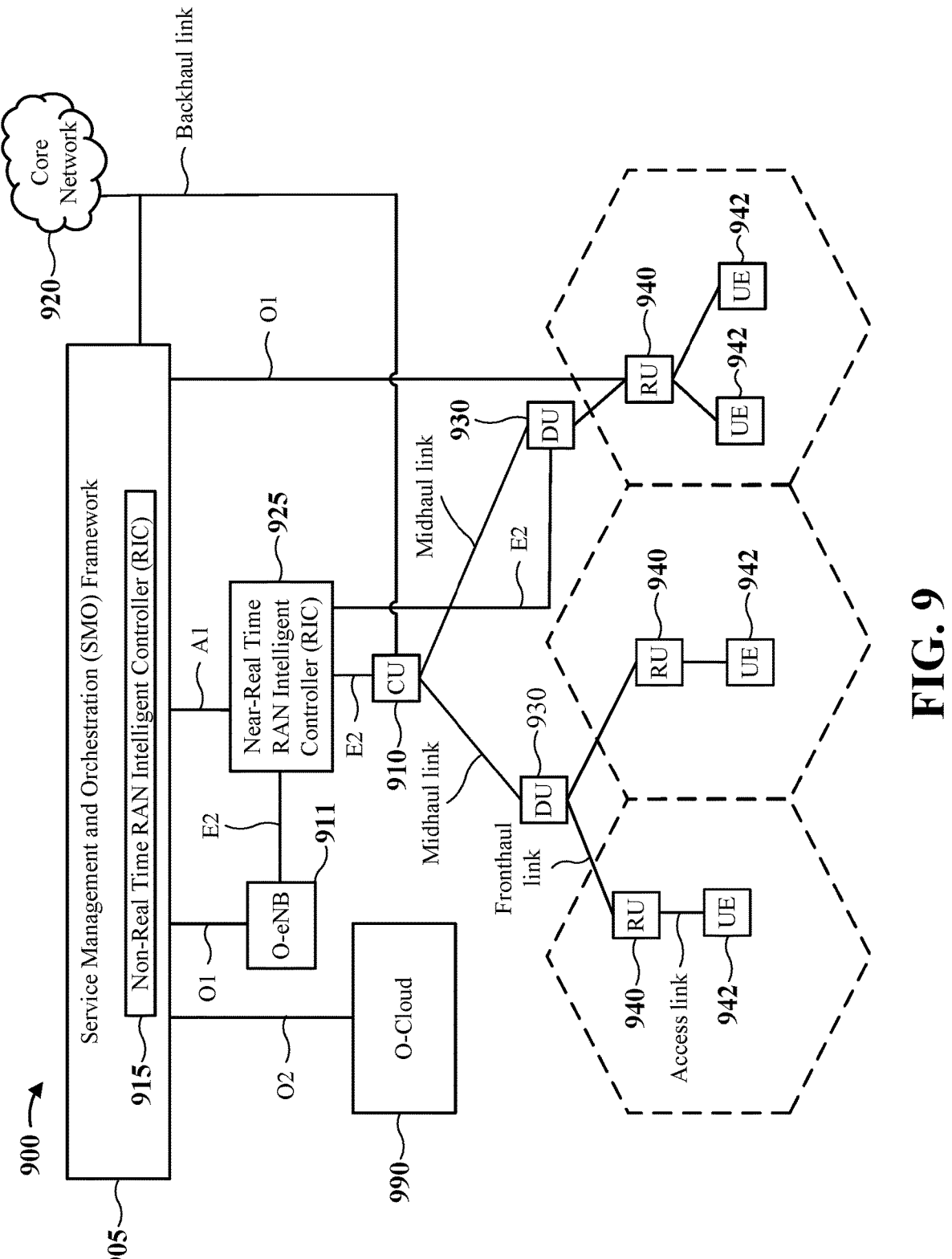
FIG. 9 is a schematic illustration of an example disaggregated base station architecture according to some aspects of the disclosure.

FIG. 9 is a schematic illustration of an example disaggregated base station 900 architecture according to some aspects of the disclosure. The disaggregated base station 900 architecture may include one or more central units (CUs) 910 that can communicate directly with a core network 920 via a backhaul link, or indirectly with the core network 920 through one or more disaggregated base station units (such as a Near-Real Time (Near-RT) RAN Intelligent Controller (RIC) 925 via an E2 link, or a Non-Real Time (Non-RT) RIC 915 associated with a Service Management and Orchestration (SMO) Framework 905, or both). A CU 910 may communicate with one or more distributed units (DUs) 930 via respective midhaul links, such as an F1 interface. The DUs 930 may communicate with one or more radio units (RUs) 940 via respective fronthaul links. The RUs 940 may communicate with respective UEs 942 via one or more radio frequency (RF) access links. In some implementations, the UE 942 may be simultaneously served by multiple RUs 940. UE 942 may be the same or similar to any of the UEs or scheduled entities illustrated and described in connection with FIG. 1 and FIG. 2, for example.

Each of the units, i.e., the CUS 910, the DUs 930, the RUs 940, as well as the Near-RT RICs 925, the Non-RT RICs 915, and the SMO Framework 905, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 910 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 910. The CU 910 may be configured to handle user plane functionality (i.e., Central Unit-User Plane (CU-UP)), control plane functionality (i.e., Central Unit-Control Plane (CU-CP)), or a combination thereof. In some implementations, the CU 910 can be logically split into one or more CU-UP units and one or more CU-CP units. The CU-UP unit can communicate bidirectionally with the CU-CP unit via an interface, such as the E1 interface when implemented in an O-RAN configuration. The CU 910 can be implemented to communicate with the DU 930, as necessary, for network control and signaling.

The DU 930 may correspond to a logical unit that includes one or more base station functions to control the operation of one or more RUs 940. In some aspects, the DU 930 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the 3rd Generation Partnership Project (3GPP). In some aspects, the DU 930 may further host one or more low PHY layers. Each layer (or module) can be implemented with an interface configured to communicate signals with other layers (and modules) hosted by the DU 930, or with the control functions hosted by the CU 910.

Lower-layer functionality can be implemented by one or more RUs 940. In some deployments, an RU 940, controlled by a DU 930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 940 can be implemented to handle over the air (OTA) communication with one or more UEs 942. In some implementations, real-time and non-real-time aspects of control and user plane communication with the RU(s) 940 can be controlled by the corresponding DU 930. In some scenarios, this configuration can enable the DU(s) 930 and the CU 910 to be implemented in a cloud-based RAN architecture, such as a vRAN architecture.

The SMO Framework 905 may be configured to support RAN deployment and provisioning of non-virtualized and virtualized network elements. For non-virtualized network elements, the SMO Framework 905 may be configured to support the deployment of dedicated physical resources for RAN coverage requirements which may be managed via an operations and maintenance interface (such as an O1 interface). For virtualized network elements, the SMO Framework 905 may be configured to interact with a cloud computing platform (such as an open cloud (O-Cloud) 990) to perform network element life cycle management (such as to instantiate virtualized network elements) via a cloud computing platform interface (such as an O2 interface). Such virtualized network elements can include, but are not limited to, CUs 910, DUs 930, RUS 940 and Near-RT RICs 925. In some implementations, the SMO Framework 905 can communicate with a hardware aspect of a 3G RAN, such as an open eNB (O-eNB) 911, via an O1 interface. Additionally, in some implementations, the SMO Framework 905 can communicate directly with one or more RUs 940 via an O1 interface. The SMO Framework 905 also may include a Non-RT RIC 915 configured to support functionality of the SMO Framework 905.

The Non-RT RIC 915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 925. The Non-RT RIC 915 may be coupled to or communicate with (such as via an A1 interface) the Near-RT RIC 925. The Near-RT RIC 925 may be configured to include a logical function that enables near-real-time control and optimization of RAN elements and resources via data collection and actions over an interface (such as via an E2 interface) connecting one or more CUs 910, one or more DUs 930, or both, as well as an O-eNB, with the Near-RT RIC 925.

In some implementations, to generate AI/ML models to be deployed in the Near-RT RIC 925, the Non-RT RIC 915 may receive parameters or external enrichment information from external servers. Such information may be utilized by the Near-RT RIC 925 and may be received at the SMO Framework 905 or the Non-RT RIC 915 from non-network data sources or from network functions. In some examples, the Non-RT RIC 915 or the Near-RT RIC 925 may be configured to tune RAN behavior or performance. For example, the Non-RT RIC 915 may monitor long-term trends and patterns for performance and employ AI/ML models to perform corrective actions through the SMO Framework 905 (such as reconfiguration via O1) or via creation of RAN management policies (such as A1 policies).

Of course, in the above examples, the circuitry included in the processor 604 is merely provided as an example. Other means for carrying out the described functions may be included within various aspects of the present disclosure, including but not limited to the instructions stored in the computer-readable medium 610 or any other suitable apparatus or means described in any one of the FIGS. 1, 2, 4, 6 and/or 9, and utilizing, for example, the processes and/or algorithms described herein in relation to FIGS. 4, 7, and/or 8.

The following provides an overview of aspects of the present disclosure:

Aspect 1: A node configured for communication in a wireless communication network, comprising: a wireless transceiver, a memory, and a processor coupled to the wireless transceiver and the memory, the processor being configured to: transmit, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from the memory.

Aspect 2. The node of aspect 1, wherein the processor is further configured to: repeat the listen before talk process in response to the sensed value of energy within the operating channel bandwidth being greater than the smallest one of: the first energy detection threshold value that is determined as the function of the operating channel bandwidth, and the second energy detection threshold value obtained from the memory.

Aspect 3: The node of aspect 1 or aspect 2, wherein the first energy detection threshold value is determined as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

Aspect 4: The node of aspect 3, wherein when the second transmit power value is equal to the first transmit power value, the first energy detection threshold value is determined only as the function of the operating channel bandwidth.

Aspect 5: The node of any of aspects 1 through 4, wherein the value obtained from the memory is a reference channel bandwidth.

Aspect 6: The node of aspect 5, wherein the reference channel bandwidth is fixed and is equal to a maximum channel bandwidth utilized by all nodes, including the node, to determine the second energy detection threshold value.

Aspect 7: A method, at a node configured for communication in a wireless communication network, the method comprising: transmitting, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

Aspect 8. The method of aspect 7, the method further comprising: repeating the listen before talk process in response to the sensed value of energy within the operating channel bandwidth being greater than the smallest one of: the first energy detection threshold value that is determined as the function of the operating channel bandwidth, and the second energy detection threshold value obtained from the memory.

Aspect 9: The method of aspect 7 or aspect 8, wherein the first energy detection threshold value is determined as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

Aspect 10: The method of aspect 9, wherein when the second transmit power value is equal to the first transmit power value, the first energy detection threshold value is determined only as the function of the operating channel bandwidth.

Aspect 11: The method of any of aspects 7 through 10, wherein the value obtained from the memory is a reference channel bandwidth.

Aspect 12: The method of aspect 11, wherein the reference channel bandwidth is fixed and is equal to a maximum channel bandwidth utilized by all nodes, including the node, to determine the second energy detection threshold value.

Aspect 13: A node configured for communication in a wireless communication network, comprising: means for transmitting, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

Aspect 14. The node of aspect 13, further comprising: means for repeating the listen before talk process in response to the sensed value of energy within the operating channel bandwidth being greater than the smallest one of: the first energy detection threshold value that is determined as the function of the operating channel bandwidth, and the second energy detection threshold value obtained from the memory.

Aspect 15: The node of aspect 13 or aspect 14, wherein the first energy detection threshold value is determined as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

Aspect 16: The node of aspect 15, wherein when the second transmit power value is equal to the first transmit power value, the first energy detection threshold value is determined only as the function of the operating channel bandwidth.

Aspect 17: The node of any of aspects 13 through 16, wherein the value obtained from the memory is a reference channel bandwidth.

Aspect 18. The node of aspect 17, wherein the reference channel bandwidth is fixed and is equal to a maximum channel bandwidth utilized by all nodes, including the node, to determine the second energy detection threshold value.

Aspect 19: A computer-readable medium storing computer-executable code that when executed by a processing circuit of a node configured for communication in a wireless communication network, causes the processing circuit to: transmit, following a listen before talk process, at least one transmission within an operating channel bandwidth in response to a sensed value of energy within the operating channel bandwidth being less than a smallest one of: a first energy detection threshold value that is determined as a function of the operating channel bandwidth, and a second energy detection threshold value obtained from a memory of the node.

Aspect 20. The computer-readable medium of aspect 19, wherein the computer-executable code further causes the processing circuit to: repeat the listen before talk process in response to the sensed value of energy within the operating channel bandwidth being greater than the smallest one of: the first energy detection threshold value that is determined as the function of the operating channel bandwidth, and the second energy detection threshold value obtained from the memory.

Aspect 21: The computer-readable medium of aspect 19 or aspect 20, wherein the first energy detection threshold value is determined as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

Aspect 22: The computer-readable medium of aspect 21, wherein when the second transmit power value being equal to the first transmit power value, the first energy detection threshold value is determined only as the function of the operating channel bandwidth.

Aspect 23: The computer-readable medium of any of aspects 19 through 22, wherein the value obtained from the memory is a reference channel bandwidth.

Aspect 24: The computer-readable medium of aspect 23, wherein the reference channel bandwidth is fixed and is equal to a maximum channel bandwidth utilized by all nodes, including the node, to determine the second energy detection threshold value.

Aspect 25: A first node configured for communication in a wireless communication network, comprising: a wireless transceiver, a memory, and a processor coupled to the wireless transceiver and the memory, the processor being configured to: transmit, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

Aspect 26: The first node of aspect 25, wherein the processor is further configured to: repeat the listen before talk process in response to the sensed value of energy in the operating channel bandwidth being greater than the smallest one of: the first energy detection threshold value that is determined as the function of the operating channel bandwidth, and the second energy detection threshold value determined as a function of a reference channel bandwidth.

Aspect 27: The first node of aspect 25 or aspect 26, wherein the reference channel bandwidth is fixed, and is equal to a maximum channel bandwidth used to determine the second energy detection threshold (EDT), which is utilized by all nodes including the first node to determine EDT.

Aspect 28: A method, at a first node configured for communication in a wireless communication network, the method comprising: transmitting, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

Aspect 29: The method of aspect 28, further comprising: repeating the listen before talk process in response to the sensed value of energy within the operating channel bandwidth being greater than a smallest one of: the first energy detection threshold value determined as the function of the operating channel bandwidth, and the second energy detection threshold value determined as the function of the reference channel bandwidth.

Aspect 30: The method of aspect 28 or aspect 29, wherein the reference channel bandwidth is fixed, and is equal to a maximum channel bandwidth used to determine the second energy detection threshold (EDT), which is utilized by all nodes including the first node to determine EDT.

Aspect 31: A first node configured for communication in a wireless communication network, comprising: means for transmitting, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

Aspect 32: The first node of aspect 31, further comprising: means for repeating the listen before talk process in response to the sensed value of energy within the operating channel bandwidth being greater than the smallest one of: the first energy detection threshold value determined as the function of the operating channel bandwidth, and the second energy detection threshold value determined as the function of the reference channel bandwidth.

Aspect 33: The first node of aspect 31 or aspect 32, wherein the reference channel bandwidth is fixed, and is equal to a maximum channel bandwidth used to determine the second energy detection threshold (EDT), which is utilized by all nodes including the first node to determine EDT.

Aspect 34: A computer-readable medium storing computer-executable code that when executed by a processing circuit of a first node configured for communication in a wireless communication network, cause the processing circuit to: transmit, following a listen before talk process, at least one transmission within an operating channel bandwidth in response to a sensed value of energy within the operating channel bandwidth being less than a smallest one of: a first energy detection threshold value determined as a function of the operating channel bandwidth, and a second energy detection threshold value determined as a function of a reference channel bandwidth.

Aspect 35. The computer-readable medium of aspect 34, wherein the computer-executable code further causes the processing circuit to: repeat the listen before talk process in response to the sensed value of energy within the operating channel bandwidth being greater than the smallest one of: the first energy detection threshold value that is determined as the function of the operating channel bandwidth, and the second energy detection threshold value determined as the function of the reference channel bandwidth.

Aspect 36: The computer-readable medium of aspect 34 or aspect 35, wherein the reference channel bandwidth is fixed, and is equal to a maximum channel bandwidth used to determine the second energy detection threshold (EDT), which is utilized by all nodes including the first node to determine EDT.

Aspect 37: A node in a wireless communication network, comprising: a processor, a memory communicatively coupled to the processor, and a transceiver communicatively coupled to the processor, wherein the processor is config-ured to implement any feature described in the attached Specification, either individually or in combination with any other feature, in any configuration.

Aspect 38: A method of wireless communication at a node within a wireless communication network for implementing any feature described in the attached Specification, either individually or in combination with any other feature, in any configuration.

Aspect 39: A node in a wireless communication network, comprising: means for implementing any feature described in the attached Specification, either individually or in com-bination with any other feature, in any configuration.

Aspect 40: A computer-readable medium storing com-puter-executable code comprising instructions for imple-menting any feature described in the attached Specification, either individually or in combination with any other feature, in any configuration.

Several aspects of a wireless communication network have been presented with reference to an exemplary imple-mentation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing Wireless Fidelity (IEEE 802.11 a.k.a. WiFi), IEEE 802.16 (WiMAX), IEEE 802.20, Ultra-Wideband (UWB), Blu-etooth, and/or other suitable systems. The actual telecom-munication standard, network architecture, and/or commu-nication standard employed will depend on the specific application and the overall design constraints imposed on the system.

Within the present disclosure, the word "exemplary" is used to mean "serving as an example, instance, or illustra-tion." Any implementation or aspect described herein as "exemplary" is not necessarily to be construed as preferred or advantageous over other aspects of the disclosure. Like-wise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly and intended to include both hardware implemen-tations of electrical devices and conductors that, when connected and configured, enable the performance of the functions described in the present disclosure, without limi-tation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A node configured for communication in a wireless communication network, comprising:

one or more memories; and one or more processors coupled to the one or more memories, the one or more processors being configured to cause the node to:

transmit, following a listen before talk process, at least one transmission within an operating channel bandwidth in response to a sensed value of energy within the operating channel bandwidth being less than a smallest one of:

a first energy detection threshold value that is a function of the operating channel bandwidth, and a second energy detection threshold value, that is a function of a reference channel bandwidth, stored in the one or more memories, wherein the reference channel bandwidth is different from the operating channel bandwidth and is selected as a maximum channel bandwidth utilized by a plurality of nodes operating according to different radio access technologies (RATs) in unlicensed spectrum.

2. The node of claim 1, wherein the one or more processors are further configured to cause the node to:

repeat the listen before talk process in response to the sensed value of energy within the operating channel bandwidth being greater than the smallest one of:

the first energy detection threshold value, and the second energy detection threshold value.

3. The node of claim 1, wherein the one or more processors are further configured to cause the node to:

determine the first energy detection threshold value as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

4. The node of claim 3, wherein in response to the second transmit power value being equal to the first transmit power value, the one or more processors are further configured to cause the node to:

determine the first energy detection threshold value only as the function of the operating channel bandwidth.

5. The node of claim 1, wherein the reference channel bandwidth is fixed and is less than the operating channel bandwidth.

6. A method, at a node configured for communication in a wireless communication network, the method comprising:

transmitting, following a listen before talk process, at least one transmission within an operating channel bandwidth in response to a sensed value of energy within the operating channel bandwidth being less than a smallest one of:

a first energy detection threshold value that is a function of the operating channel bandwidth, and a second energy detection threshold value, that is a function of a reference channel bandwidth, stored in one or more memories of the node, wherein the reference channel bandwidth is different from the operating channel bandwidth and is selected as a maximum channel bandwidth utilized by a plurality of nodes operating according to different radio access technologies (RATs) in unlicensed spectrum.

7. The method of claim 6, the method further comprising:

repeating the listen before talk process in response to the sensed value of energy within the operating channel bandwidth being greater than the smallest one of:

the first energy detection threshold value, and the second energy detection threshold value.

8. The method of claim 6, further comprising:

determining the first energy detection threshold value as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

9. The method of claim 8, wherein in response to the second transmit power value being equal to the first transmit power value, the method further comprises:

determining the first energy detection threshold value only as the function of the operating channel bandwidth.

10. The method of claim 6, wherein the reference channel bandwidth is fixed and is less than the operating channel bandwidth.

11. A node configured for communication in a wireless communication network, comprising:

means for transmitting, following a listen before talk process, at least one transmission within an operating channel bandwidth in response to a sensed value of energy within the operating channel bandwidth being less than a smallest one of:

a first energy detection threshold value that is a function of the operating channel bandwidth, and a second energy detection threshold value, that is a function of a reference channel bandwidth, stored in one or more memories of the node, wherein the reference channel bandwidth is different from the operating channel bandwidth and is selected as a maximum channel bandwidth utilized by a plurality of nodes operating according to different radio access technologies (RATs) in unlicensed spectrum.

12. The node of claim 11, further comprising:

means for repeating the listen before talk process in response to the sensed value of energy within the operating channel bandwidth being greater than the smallest one of:

the first energy detection threshold value, and the second energy detection threshold value.

13. The node of claim 11, further comprising:

means for determining the first energy detection threshold value as the function of the operating channel bandwidth and further as a function of a ratio of a first transmit power value corresponding to a maximum transmitter power and a second transmit power value corresponding to an intended transmitter power of the node, the second transmit power value being less than or equal to the first transmit power value.

14. The node of claim 13, wherein in response to the second transmit power value being equal to the first transmit power value, the first energy detection threshold value is determined only as the function of the operating channel bandwidth.

15. The node of claim 11, wherein the reference channel bandwidth is fixed and is less than the operating channel bandwidth.

16. The node of claim 1, wherein the second energy detection threshold value is set to provide all users of the unlicensed spectrum with an equal opportunity to transmit in a given channel within the operating channel bandwidth following the listen before process that indicates the given channel is available.

* * * * *